(12) United States Patent
Blach

(10) Patent No.: US 6,215,409 B1
(45) Date of Patent: Apr. 10, 2001

(54) DISPLAY APPARATUS

(75) Inventor: Tomasz Blach, Brisbane (AU)

(73) Assignee: Solaglo Pty Ltd., Queensland (AU)

( * ) Notice: Subject to any disclaimer, the term of this patent is extended or adjusted under 35 U.S.C. 154(b) by 0 days.

(21) Appl. No.: 09/192,798

(22) Filed: Nov. 16, 1998

Related U.S. Application Data

(63) Continuation of application No. PCT/AU97/00164, filed on Mar. 13, 1997.

(30) Foreign Application Priority Data

May 17, 1996 (AU) .................................................. 52326/96

(51) Int. Cl.[7] .................................................. G08B 5/00
(52) U.S. Cl. .................................. 340/815.4; 340/815.42; 340/815.47; 340/815.45; 340/815.73; 340/331; 362/31; 362/800; 362/153.1
(58) Field of Search .......................... 340/815.4, 815.42, 340/815.43, 815.45, 815.47, 321, 331; 362/31, 32, 26, 153.1; 404/14

(56) References Cited

U.S. PATENT DOCUMENTS

| 5,005,108 | | 4/1991 | Pristash et al. ........................ 362/26 |
| 5,027,258 | * | 6/1991 | Schoniger et al. ..................... 362/31 |
| 5,146,354 | * | 9/1992 | Piesinger ............................... 362/31 |
| 5,151,679 | * | 9/1992 | Dimmick ............................... 362/31 |
| 5,219,217 | * | 6/1993 | Aikens .................................. 362/32 |
| 5,276,591 | * | 1/1994 | Hegarty ................................. 362/31 |

FOREIGN PATENT DOCUMENTS

| A15598080 | 2/1980 | (AU) . |
| A11707792 | 12/1992 | (AU) . |
| WO891171 | 11/1989 | (WO) . |
| WO9617207 | 6/1996 | (WO) . |
| WO9744771 | 11/1997 | (WO) . |

* cited by examiner

Primary Examiner—Donnie L. Crosland
(74) Attorney, Agent, or Firm—Denton L. Anderson; Sheldon & Mak

(57) ABSTRACT

An edge illuminated sign is provided with a light dispersal to guide light from a light source into an edge of the sign. The light source is an LED and the light dispersal is a triangular prism provided with a recess for enclosing the LED.

12 Claims, 3 Drawing Sheets

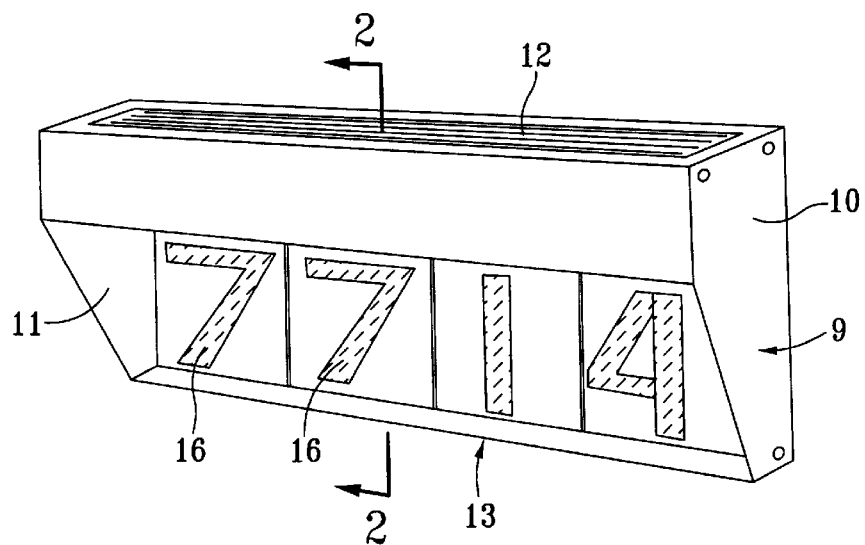
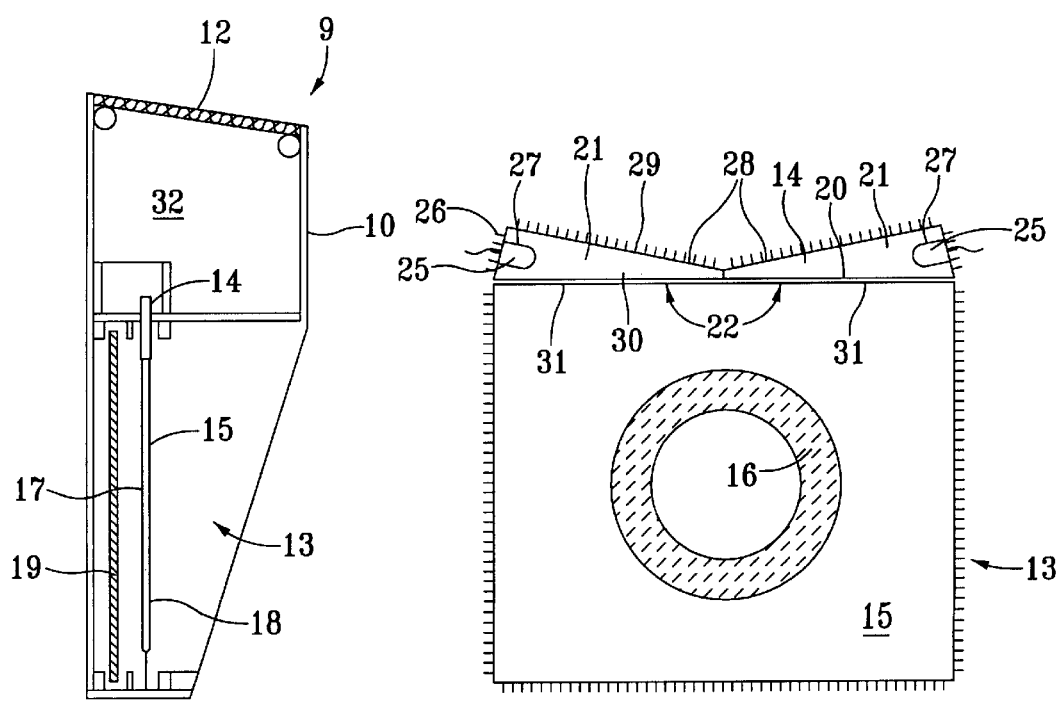

DISPLAY APPARATUS

This application is a continuation of Pct/AU97/00164 filed Mar. 13, 1997.

This invention relates to display apparatus.

This invention has particular application to display apparatus for displaying house numbers, such as for the purposes of identification of any dwelling or other building structure, and street names, particularly during the hours of darkness but also during daylight hours. However it has other application in general signage and advertising.

House numbering is a well known method for identifying established dwelling houses and the like, numbers commonly being permanently secured to a visible mounting. Frequently these numbers cannot be observed during the night without the aid of some form of lighting. In addition existing numbers fade and deteriorate, and therefore cannot be readily observed.

The present invention aims to alleviate the above disadvantage by providing display apparatus which permits displayed information to be readily viewed both during daylight and night-time hours.

Accordingly, the present invention in one aspect provides an illuminated display apparatus for displaying indicia, including:

a transparent panel;

a light source;

means for introducing light from the light source into the transparent panel whereby the introduced light is internally reflected within the panel from the panel air interfaces formed at the front and rear faces of the panel; and indicia covering in intimate contact with the rear face and forming a panel/indicia covering interface enabling internal light in the panel to illuminate the indicia covering for visibility thereof through the front face.

The light may be introduced in any convenient manner and along one or more sides of the panel. Preferably said means for introducing light from the light source includes light dispersal means dispersing light through at least one edge of said panel. However it is preferred that the light is introduced into the transparent panel from the illuminating means as dispersed light along at least one edge of the panel.

In a preferred aspect of the invention the illumination means comprises a prism having one transparent or translucent face arranged in light transmitting contact with an edge of the panel and having a light source therein and reflective faces substantially confining light transmission therefrom to the one transparent or translucent face. More preferably the prism is a right angled triangular prism arranged with its hypotenuse as the transparent or translucent face and the recess for the LED in the shorter of the other two faces.

The hypotenuse may extend the full length of the one side of the panel and it may house a plurality of LEDS or incandescent bulbs or the like. However it is preferred that each prism has a relatively short hypotenuse and a plurality of such prisms and associated LEDS are disposed in series along the full length of the one side of the panel. Suitably the panel and the prisms are formed from similar thickness material such as acrylic plastics sheet.

The LEDS may be of any desired colour as may be the face of the indicia which contacts the panel. Preferably however the light source is provided as a green or yellow coloured light and the contact face of the indicia is coloured white or yellow. Other combinations which may be desirable are a white light and any colour contact face.

In a further aspect this invention resides broadly in light dispersal means comprising a triangular prism having opposed major faces and smaller side faces interconnecting the major faces and including a light source housed within a recess disposed medially in one said smaller faces and reflective means covering the major faces, the smaller face containing the light source recess and an adjacent smaller face.

The light source is suitably a low powered light source such as a LED however any light source which may operate effectively confined in a recess or shining its light into the recess may be utilised.

It is also preferred that the display apparatus when used for street or house numbering utilise a battery operated light source and solar powered recharging means for charging the battery during daylight hours.

In order that this invention may be more readily understood and put into practical effect, reference will now be made to the accompanying drawings which illustrate a preferred embodiment of the invention:

FIG. 1 is a perspective view of a display assembly according to the invention;

FIG. 2 is a cross-sectional view of the assembly of the invention;

FIG. 3 is a side elevational view of the display assembly used in the embodiment of FIG. 1;

Figure 4:
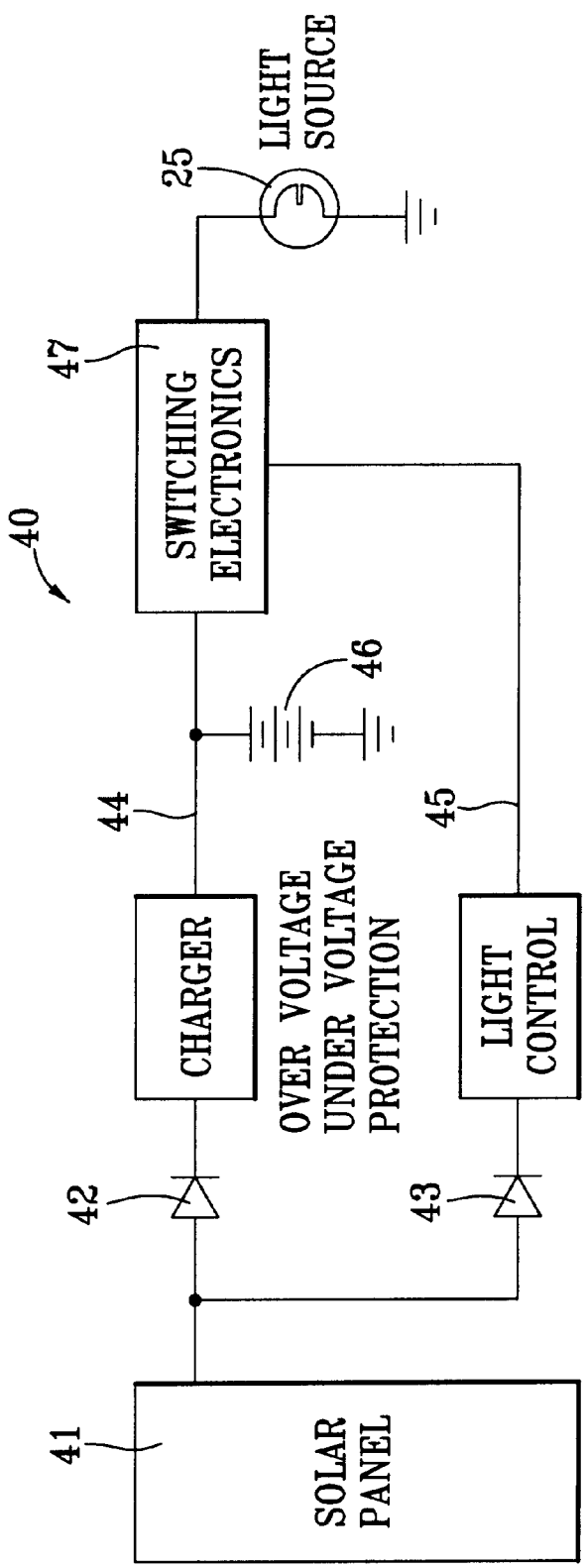
FIG. 4 illustrates a typical circuit layout for the assembly of the invention.

Referring to the drawings there is illustrated a house number display assembly 9 having an external housing 10 formed, in this embodiment, of polyvinyl chloride (P.V.C.), but of other material if desired, and having on one face arranged a see-through window of panel 11. The uppermost face of the housing 10 accommodates a horizontally disposed solar panel 12 for generating electricity to power the sign illumination source. A number display assembly 13 with integral illumination means 14 is removably supported within the housing 10 behind the window 11.

The display assembly 9 is adapted to be secured to a permanent structure by any suitable means so that its window 11 is positioned for unobstructed view from the street or house access path or lane and with the solar panel 12 exposed to the sun during daylight hours and especially the hours during the middle of the day.

The number display panel assembly 13 includes a light conducting panel 15 formed from perspex, glass or other material which has good light conducting properties and which has stickers or other indicating means 16 which carry the information to be displayed affixed to the rear face 17 of the panel 15. In the illustrated embodiment the indicating means 16 are numerals indicating a house number which have their face to be displayed covered with a transparent adhesive, such as clear double sided adhesive tape, and bonded thereby to the back face 17 in a manner which excludes entrained air bubbles between the displayed face of the indicating means 16 and the panel 15.

Light is supplied to the upper edge 20 of the panel 15 through a series of light diffusing blocks 21, depending on the length of the panel 15 and being two in the illustrated embodiment which cover the full length of the upper edge 20. Each light diffusing block 21 comprises a transparent light diffusing element 22 of triangular prism configuration and suitably formed of the same material as the panel 15.

A light source 25 and preferably a light emitting diode (LED) or a bright light globe is mounted in the shorter exposed side 26 of each diffusing block 21. For this purpose each LED 25 projects snugly into an accommodating recess 27 formed in the diffusing block 21 and is held therein by any suitable means such as by wedging or by the use of a clear adhesive. The exposed sides 26 and 28 and the opposed faces 30 of each diffusing block 21 are coated by a highly reflective coating 29 such as aluminum foil, or otherwise painted or treated to prevent passage of light therethrough.

The aluminum foil is used to cause good reflection of light from the coated surfaces and the arrangement of the light source and configuration of the diffusing block 21 is such that total internal reflection of the dispersed light entering the panel 15 occurs as a result of low angles of incident light relative to the triangular side faces 17 and 18 and the much greater refractive index of the material forming the panel 15 than the air surrounding the panel 15.

The diffusing block 21 is triangular, and preferably formed as a right angle triangle, such that the hypotenuse face 31 abuts the panel 15. The hypotenuse face 31 is roughed by sanding with a coarse sand paper to improve the scattering of the light fully across and evenly dispersed the hypotenuse into the panel 15.

Thus light will pass through the abutting lower edges 31 of the diffusing blocks 21 and the upper edge 20 and into the panel 15 where it will be internally reflected except where the indicating means 16 is adhered to the side face 17. Thus the indicating means 16 will be illuminated and will be visible through the front face 18 of the panel 15, creating an illusion of the light source being the indicating means 16. Preferably a black backing sheet 19 is disposed behind the indicating means 16 and in spaced relationship with the panel 15 so that the panel/air interface is maintained across the face 17 except where the indicating means 16 is adhered thereto.

The illumination means may be connected to an external power source, such as mains power if desired and powered full time such that the indicating means 16 will be visible as an illuminated display both during daylight and night-time hours. However in many applications current for the illumination means 14 will be supplied to each LED 14 from a battery supported in the top housing portion 32 and charged from the solar panel 12 so that each display assembly 9 will be self contained.

As illustrated the solar panel 12 is connected to the illumination means 14 as in the circuit 40 illustrated in FIG. 4 wherein the arrangement is such that current is only supplied to the LED's 25 when ambient light falls below a predetermined level. In this configuration the indicating means 16 will be clearly visible during daylight hours through natural light incident upon the panel 15 and during the night-time hours as an illuminated display as disclosed above.

In this respect the circuit 40 connects the solar panel 41 through respective diodes 42 and 43 to the light source, the LED 14 through circuit branches 44 and 45 respectively. One branch 44 is connected to the LED 14 and contains the battery 46 and a switching module 47 which monitors a comparative condition through the branch 45 whereby solar panel 41 will commence charging the battery 46 and switch off supply to the LED when the voltage of the output from the solar cell exceeds the battery voltage. When this position is reversed the supply to the LED will commence, supplied from the battery 46 until the sensed conditions are again reversed.

Figure 5:
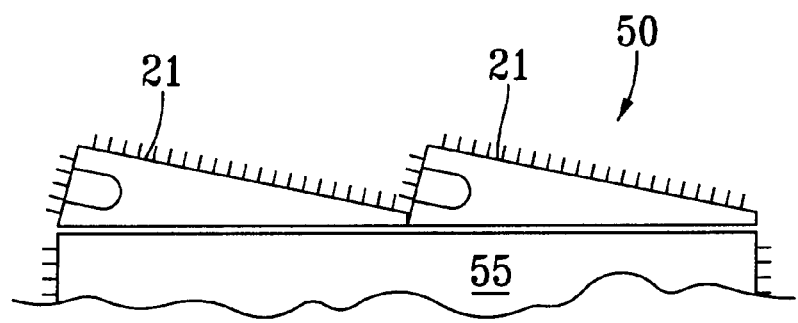
FIG. 5 is a side elevational view of an alternate arrangement of the light diffusing blocks.

If desired the light diffusing block 21 can be arranged in a saw tooth arrangement with any desired number being arranged across the top or along the upright sides of a panel 15 as illustrated in FIG. 5, the number of light diffusing blocks 21 being dependent on the dimensions of the indicating means 16 and can be placed on all four sides of the panel 15 if high brightness is needed.

Figure 6:
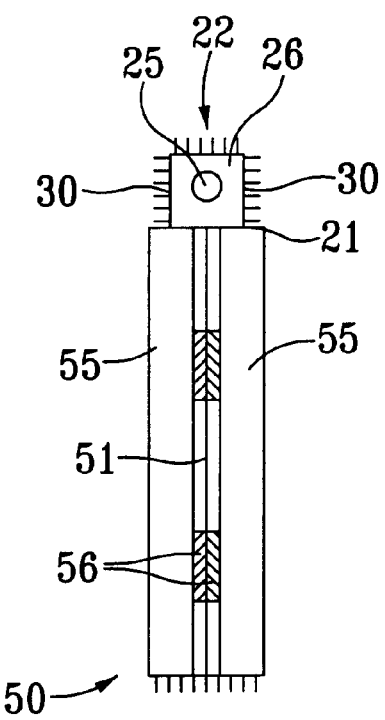
FIG. 6 illustrates a two-sided version of the invention.

FIG. 6 illustrates a side view of a double sided display assembly 50. In this embodiment, two sets of indicating means 56 are placed back to back on separate panels 55, separated by a black dividing sheet 51 spaced from the panel faces. The light diffusing blocks 21 are formed of such width as to enable them to span across the upper edges of the side by side panels 55 to supply light to both, however separate light blocks may be used on each panel 55 to enhance intensity if desired. When unlit, the indicating means 56 will be visible against a black background.

The panel 55 may be supported from a housing of similar form to that of the previous embodiment and arranged with a view-through transparent protective panel at each side thereof suitably being of glass or clear plastics.

A suitable form for each light diffusing block 21 is a right angle triangular shape having a hypotenuse of about 50 mm long and an adjacent side supporting a high intensity LED which is able to receive the recess diameter with similar clear distances at each side thereof.

Whilst the above has been given by way of illustrative embodiments of the invention, all such modifications and variations thereto as would be apparent to persons skilled in the art are deemed to fall within the broad scope and ambit of the invention as herein defined in the appended claims.

What is claimed is:

1. A display assembly for displaying indicia, comprising:

a transparent panel including parallel major faces spaced by panel edges;

a light source;

a light diffusing element for dispersing light from the light source into the transparent panel whereby the introduced light is internally reflected within the panel from panel/atmosphere interfaces formed at each said major face of the panel; and indicia covering a portion of one of the major faces so as to prevent internal reflection from one of said panel/atmosphere interfaces and permitting introduced light to travel through the covered portion of said one of the major faces to illuminate the indicia.

2. A display assembly as claimed in claim 1, wherein the light diffusing element disperses light through at least one of said edges.

3. A display assembly as claimed in claim 2, wherein the light diffusing element comprises a prism having a light dispersing face arranged in light transmitting contact with said at least one edge, a light source therein, and reflective faces substantially confining light transmission therefrom to said light dispersing face.

4. A display assembly as claimed in claim 2, wherein said light diffusing element comprises a triangular prism including a light dispersing face, said prism formed with a recess in which a LED is enclosed.

5. A display assembly as claimed in claim 4, wherein the triangular prism is a shallow, right-angled triangular prism arranged with its hypotenuse face as the light dispersing face, the recess for the LED located in the shorter of the two other faces which bound triangular faces of said prism.

6. A display assembly as claimed in claim 5, wherein reflective material is disposed over faces of the triangular prism other than the light dispersing face.

7. A display assembly as claimed in claim 5, wherein a plurality of triangular prisms, each in combination with an LED, are disposed along said at least one edge.

8. A display assembly as claimed in claim 3, wherein the panel and the prism are formed from materials of the same thickness.

9. A display assembly as claimed in claim 3, wherein the panel and the prism are formed from similar plastics.

10. A display assembly as claimed in claim 1, wherein said light source emits yellow or green light and wherein said indicia includes a white or yellow color face abutting said panel.

11. A light diffusing element comprising a triangular prism including three rectangular faces wherein one of said three faces is light dispersive, said prism including a recess formed in one of said rectangular faces other than the light dispersive face, the recess housing an LED.

12. A light diffusing element as claimed in claim 11, wherein a reflective material is disposed over faces of said prism other than the light dispersive face.

\* \* \* \* \*